K. KELLER.
TAMBOUR FRAME FOR EMBROIDERING MACHINES.
APPLICATION FILED JUNE 11, 1912.
1,066,914.
Patented July 8, 1913.
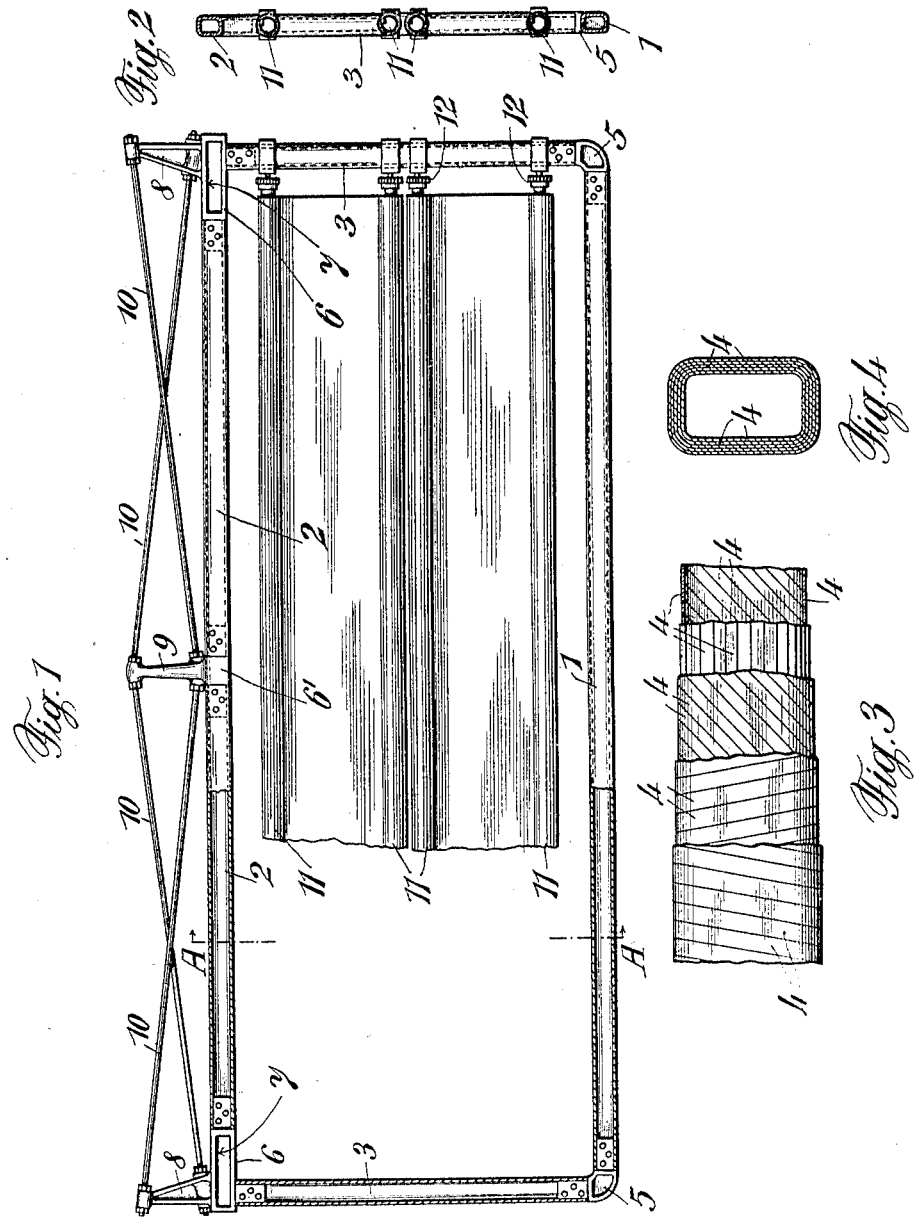
Witnesses:
B. Sommers
E. Leckert.
Inventor:
Karl Keller,
By Henry Orth Jr
Atty.

UNITED STATES PATENT OFFICE.

KARL KELLER, OF ARBON, SWITZERLAND, ASSIGNOR TO THE FIRM OF ADOLPH SAURER, OF ARBON, SWITZERLAND.

TAMBOUR-FRAME FOR EMBROIDERING-MACHINES.

1,066,914.      Specification of Letters Patent.      Patented July 8, 1913.

Application filed June 11, 1912. Serial No. 703,034.

*To all whom it may concern:*

Be it known that I, KARL KELLER, a citizen of the Republic of Switzerland, residing at Romanshornerstrasse, Arbon, Switzerland, have invented certain new and useful Improvements in Tambour-Frames for Embroidering-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my present invention is a tambour frame for embroidering machines, in which the longitudinal and lateral parts are formed by hollow bars, or bars of any other suitable cross-section, wherein the bars consist of several crossed layers of a substance of small specific weight combined by a cement, the parts being connected to each other by corner pieces of which at least one is provided with guides for suspending the frame.

In the accompanying drawing the invention is illustrated by way of example.

Figure 1 is a side elevation of a tambour frame according to my invention, with parts shown in section. Fig. 2 is a section on line A—A of Fig. 1. Figs. 3 and 4 show on an enlarged scale a portion of a hollow bar forming a part of the tambour frame.

In the tambour frame as illustrated on the drawing the longitudinal parts 1 and 2 as well as the lateral parts 3 are formed by hollow bars. The bars are composed of several layers of thin strips 4 of wood, paper or other substance of small specific weight, which strips are combined by a cement as glue for instance. The strips may be wound around the bar alternately in one layer from the right to the left and in the following layer from the left to the right in spiral lines either of equal or alternately of different pitch. The strips of one or several layers may also be arranged rectilinear side by side in the longitudinal direction of the bars and the strips of the other layers may be wound in spiral lines of small or large pitch, as indicated by Fig. 3. The strips may be arranged in any other suitable manner, but always so that the strips of two joining layers are crossed at an angle with each other. The cross section of the hollow bars may be circular, oval or rectangular as shown in Figs. 2 and 4, or of any other suitable shape. The so formed hollow bars are connected to each other by corner pieces, the bars 1 and 3 by connecting parts 5, the rods 3 with the rod 2 by connecting parts 6 and the parts of rod 2 by a part 6′. The connecting parts may also be composed of a substance of small specific weight, as wood, aluminum or any other light metal, but they are not composed of several layers as the hollow rods, on the contrary they are homogeneous. If the connecting parts are of metal, they may also be made hollow. They are provided with projections, which pass into the hollows of the bars 1, 2 and 3 and are secured to the latter by means of screws.

At least the connecting parts 6 are provided with slides 7, by which the tambour frame may be suspended. Moreover the connecting parts 6 are provided with standards 8 and the connecting part 6′ with a standard 9 which are made of one piece with the connecting parts, for instance of aluminum. Wires 10 connecting to the projections are to resist the tensile and compressive stresses.

The tambour frame for embroidering machines according to this invention as compared with the hitherto used frames of wood, iron, aluminum or the like, possesses the advantage of being lighter, more capable of offering resistance and more stable. In consequence of the small weight undesirable forces by the moving masses of the frame are avoided.

I claim:

1. In a tambour-frame for embroidering machines, longitudinal and lateral parts made of hollow bars of any suitable cross section wherein the bars consist of several layers of thin crossed strips of a substance of small specific weight, corner pieces connecting the parts to each other, and guides provided on at least some of the corner pieces for suspending the frame.

2. In a tambour-frame for embroidering machines, longitudinal and lateral parts made of hollow bars of any suitable cross section wherein the bars consist of several layers of thin crossed strips of a substance of small specific weight, corner pieces connecting the parts to each other, projections on the corner pieces passing into the hollow bars and connected to the latter, and guides provided on at least some of the corner pieces for suspending the frame.

3. In a tambour frame for embroidering machines, longitudinal and lateral parts made of hollow bars of any suitable cross section wherein the bars consist of several layers of thin crossed strips of a substance of small specific weight, corner pieces connecting the parts to each other, standards connected to the corner pieces, wires attached to said standards, and guides provided on at least some of the corner pieces for suspending the frame.

In testimony that I claim the foregoing as my invention, I have signed my name in presence of two subscribing witnesses.

KARL KELLER.

Witnesses:
ERNST FISCHER,
AUGUST RISEGG.

Copies of this patent may be obtained for five cents each, by addressing the "Commissioner of Patents, Washington, D. C."